No. 621,262. Patented Mar. 14, 1899.
C. G. LUIS.
ACETYLENE GAS GENERATOR.
(Application filed Feb. 1, 1897.)
(No Model.)
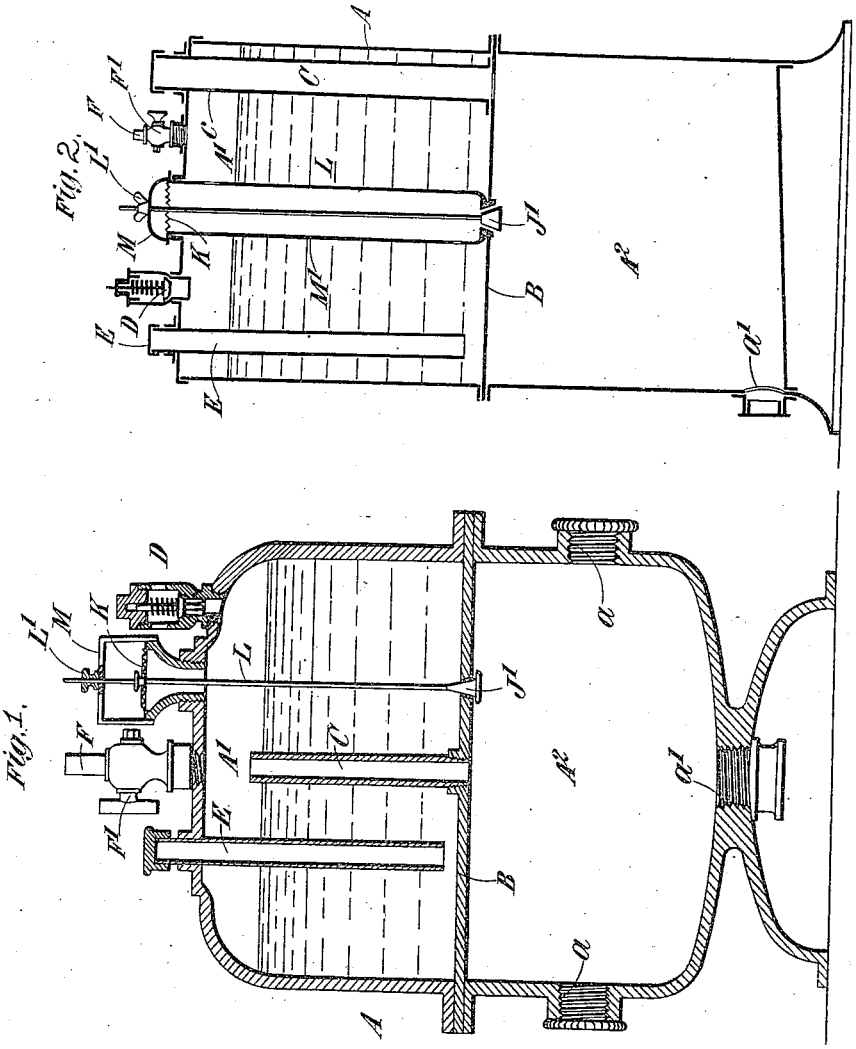
Witnesses
Inventor:
Caesar G. Luis
by James L. Norris
attorney

UNITED STATES PATENT OFFICE.

CAESAR GUSTAV LUIS, OF DENMARK HILL, ENGLAND.

ACETYLENE-GAS GENERATOR.

SPECIFICATION forming part of Letters Patent No. 621,262, dated March 14, 1899.

Application filed February 1, 1897. Serial No. 621,526. (No model.)

*To all whom it may concern:*

Be it known that I, CAESAR GUSTAV LUIS, merchant, a subject of the Emperor of Germany, residing at 24 Champion Grove, Denmark Hill, in the county of Surrey, England, have invented certain new and useful Improvements in Apparatus for Use in the Production of Acetylene Gas, (for which I have obtained Letters Patent in Great Britain, No. 1,332, dated January 18, 1896; in Belgium, No. 125,532, dated December 31, 1896, and in France, No. 262,722, dated January 2, 1897,) of which the following is a specification, reference being had to the accompanying drawings.

This invention relates to apparatus for use in the production of acetylene gas by the action of water on calcium or other suitable carbid.

My improved apparatus is constructed to work automatically—that is to say, it generates gas only as required for immediate consumption—and the said apparatus is capable of holding a considerable quantity of calcium carbid and water, so that frequent charging thereof is not required.

The improved apparatus comprises a metal or other vessel divided by a horizontal partition into two chambers, the upper one of which is arranged to contain the water and the lower one of which contains the calcium carbid. A valve is provided in the partition to control the flow of the water from the upper to the lower chamber, and the said valve is operated by the pressure of the gas in the apparatus and is opened more or less in accordance with the variations of the pressure.

I may construct the apparatus as a table-lamp or as a generator for supplying several burners in different parts of a house or building.

Referring to the accompanying drawings, Figures 1 and 2 are sectional elevations of an acetylene-gas-generating apparatus constructed according to my invention.

Like letters of reference denote corresponding parts in both figures.

A is the generating vessel, made sufficiently strong to withstand the internal pressure of the gas.

B is a partition dividing the generator into two compartments or chambers, the upper one $A'$ of which contains the water and the lower one $A^2$ of which contains the calcium carbid. The chamber $A^2$ is provided with filling or charging apertures $a\,a$ and with an outlet $a'$ for drawing off the waste or residue from the calcium carbid. All of these openings are provided with suitable air-tight caps or stoppers for closing them.

C is a pipe leading from the carbid-chamber to a point above the surface of the water in the water-chamber and forming a communication by which the gas passes from the lower to the upper chamber.

The upper chamber is provided with a safety-valve D and with a charging-tube E. The latter extends downwardly to a point below the surface of the water and is furnished with an air-tight cap or stopper at its outer end.

F is the gas-outlet pipe which leads to the burner or burners and which is provided with a tap $F'$.

To facilitate the cleaning of the carbid-chamber, I sometimes make it separate from the water-chamber, and when in use I screw it or bolt it, in an air-tight manner, to the latter chamber. I sometimes make the bottom of the carbid-chamber removable for the same purpose.

The generation of gas is regulated by a valve $J'$, that controls communication between the chambers $A'$ and $A^2$, and which valve is actuated by a diaphragm K in accordance with variations of gas-pressure above the level of the water in the upper chamber. The diaphragm is exposed on one side to the pressure of the gas in the generator-chamber and on the other side to the external atmospheric pressure. It is connected to the valve by a rod L.

M is a perforated cover or shield for protecting the diaphragm from contact with outside bodies, while allowing the atmosphere to freely act on the diaphragm.

In Fig. 2 the valve and diaphragm are contained in a perforated tube $M'$, which is screwed at the lower end into the partition B and at the upper end into the top of the chamber $A'$.

$L'$ is a wing-nut by which the valve may be closed when desired. In this construction the tube C extends through the top of the water-chamber and serves as the charging-tube for the carbid-chamber. It is closed at the upper end by a cap. The gas escapes into the water-chamber through an opening c in the side of the tube C.

What I claim is—

1. A self-contained acetylene-gas generator consisting of a single chamber divided by a horizontal partition into an upper and lower compartment, the upper compartment to contain water and the lower one to contain carbid; a vertical tube extended from an opening in said partition and discharging into a space above the level of the water in the said upper compartment where the gas collects; a gas-controlled valve for more or less opening an aperture in said partition through which water from the upper compartment passes to the carbid in the lower compartment; a vertical tube for charging the upper compartment with water and extended down to a point below the level of the water, and an air-tight cap for closing the top of said tube, substantially as described.

2. A self-contained acetylene-gas generator consisting of a single chamber divided by a horizontal partition into an upper and a lower compartment, the upper one containing water and the lower one a suitable carbid, a vertical tube extending from an opening in the said partition through the upper compartment to the exterior thereof and closed at its upper extremity by an air-tight cap, said tube enabling carbid to be fed into the lower compartment and having lateral openings communicating with a space above the level of the water in the upper compartment where the gas collects; a gas-controlled valve for more or less opening or closing an aperture in the said partition through which the water reaches the carbid in the lower compartment, said gas-controlled valve being surrounded by a tube perforated near its lower end to communicate with the surrounding water and likewise perforated near its upper end to communicate with the gas-space above the water; a vertical tube for charging the upper compartment with water extending downwardly to a point below the surface of the water and closed at its outer extremity by an air-tight cap; and an outlet at the bottom of the lower compartment for drawing off waste or residue, said outlet being closed by an air-tight cap; all substantially as described and for the purposes specified.

In testimony whereof I have hereunto set my hand this 8th day of January, 1897.

CAESAR GUSTAV LUIS.

Witnesses:
A. B. CROFTS,
W. M. HARRIS.